(12) United States Patent
Song et al.

(10) Patent No.: US 8,437,367 B2
(45) Date of Patent: May 7, 2013

(54) METHOD FOR CHANGING SERVICE QUALITY OF A CONTENT ADAPTIVELY

(75) Inventors: Yu Kyoung Song, Gyeonggi-do (KR); Kyung Ju Lee, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 319 days.

(21) Appl. No.: 12/901,953

(22) Filed: Oct. 11, 2010

(65) Prior Publication Data

US 2011/0055708 A1 Mar. 3, 2011

Related U.S. Application Data

(63) Continuation of application No. 11/913,056, filed as application No. PCT/KR2006/001606 on Apr. 28, 2006, now Pat. No. 7,929,437.

(60) Provisional application No. 60/676,225, filed on Apr. 29, 2005.

(51) Int. Cl.
*H04J 3/24* (2006.01)

(52) U.S. Cl.
USPC .......................................... 370/465

(58) Field of Classification Search .................. None
See application file for complete search history.

(56) References Cited

U.S. PATENT DOCUMENTS

| | | | |
|---|---|---|---|
| 5,742,592 A | 4/1998 | Scholefield et al. | |
| 6,094,431 A | 7/2000 | Yamato et al. | |
| 6,345,038 B1 | 2/2002 | Selinger | |
| 6,377,549 B1 | 4/2002 | Ngo et al. | |
| 6,567,416 B1 | 5/2003 | Chuah | |
| 6,594,265 B1 | 7/2003 | Etorre et al. | |
| 2003/0223414 A1 | 12/2003 | Wong | |
| 2004/0008688 A1 | 1/2004 | Matsubara et al. | |
| 2005/0048983 A1 | 3/2005 | Abraham et al. | |
| 2005/0198682 A1 | 9/2005 | Wright | |
| 2006/0036741 A1 | 2/2006 | Kiss et al. | |
| 2012/0180080 A1* | 7/2012 | Lajoie ............................ 725/14 |

OTHER PUBLICATIONS

Dou, C., et al., "An Agent-Based Framework with QoS-aware Content Negotiation for Gateway-based Nomadic Applications," The IEEE 53rd Annual Vehicular Technology Conference 2001, vol. 4, pp. 3054-3058, May 6, 2001.

Chatterjee, S., et al., "Adaptive QoS Resource Management in Dynamic Environments," The IEEE International Conference on Multimedia Computing and Systems 1999, vol. 2, pp. 997-998, Jun. 7, 1999.

Thang, T.C., et al., "Modality Conversion for QoS Management in Universal Multimedia Access," The IEEE Proceedings on Vision, Image and Signal Processing, vol. 152, No. 3, pp. 374-384, Jun. 3, 2005.

* cited by examiner

*Primary Examiner* — Kevin C Harper
(74) *Attorney, Agent, or Firm* — Lee, Hong, Degerman, Kang & Waimey

(57) ABSTRACT

The present invention relates to a method for changing service quality of a content adaptively. In the present method, when allowance of access to a network is requested, whether transfer speed demanded by the request of access allowance can be provided is checked. If can not be provided, service quality of a connection being serviced is lowered. In the meantime, the present method monitors whether available bandwidth is generated, and upgrades service quality of a connection being serviced when available bandwidth is generated. The above operations can make a given network resource fully used.

6 Claims, 5 Drawing Sheets

METHOD FOR CHANGING SERVICE QUALITY OF A CONTENT ADAPTIVELY

CROSS-REFERENCES TO RELATED APPLICATIONS

The present application is a continuation of U.S. application Ser. No. 11/913,056, filed Jun. 27, 2008, now U.S. Pat. No. 7,929,437, which is a national stage application of International Application Number PCT/KR2006/001606 filed Apr. 28, 2006, which claims the benefit of Provisional Application No. 60/676,225, filed Apr. 29, 2005 all of which are incorporated herein in their entireties.

TECHNICAL FIELD

The present invention is related to a method for transferring contents data through a home network, e.g., a home network based on UPnP.

BACKGROUND ART

Recently, economical and popular networking technologies based on compact devices of various kinds are emerging or being commercialized. With various home appliances such as refrigerators, TVs, washing machines, PCs, and audio equipments connected to a home network, people can use the appliances comfortably. To implement home networking as above, UPnP™ (hereinafter, it is called as UPnP for short.) specification has been proposed.

A basic UPnP network consists of a plurality of UPnP devices, service, and a control point (CP). Service in the context of UPnP network corresponds to a smallest control unit on a network, being modeled by a state parameter. CP (Control Point) in an UPnP network corresponds to a control application equipped with a function for detecting and controlling other devices and/or services, being operated in an easy to handle physical device such as a PDA. CP can also be realized in a device by further incorporating a renderer service which displays an image by rendering media data. Therefore, a plurality of CPs can exist on an UPnP network; a user can choose and utilize a handy CP depending on the user's current location or employed device, thereby controlling operations on a desired service.

If a home network as described above is implemented at a particular place, e.g., in home, a user can make good use of desired operations such as duplicating or transferring data among dissimilar devices irrespective of the user's location. In addition, a plurality of users can share the same devices at the same place simultaneously.

When a plurality of users use devices connected to a network simultaneously or sequentially or make a plurality of tasks carried out simultaneously or sequentially on the devices connected to a network, required data transfer rates may exceed the bandwidth provided by the network. In this case, network access for data transfer must be limited.

For example, with a multitude of contents data being streamed through a network, if additional network access is requested and current network cannot meet bandwidth requirement demanded by the request, the request is refused or if the priority of additional access request is higher than that of a part of a current streaming connection, the current streaming connection is released. In this case, a user watching streaming contents experiences abrupt disconnection of the contents.

DISCLOSURE OF THE INVENTION

The present invention, by changing service quality of contents adaptively, can fully accommodate connections with a limited network resource.

Also, the present invention, by changing service quality of contents adaptively, enables the contents to be provided with the best quality achievable within a limited network resource.

A method for changing service quality adaptively in accordance with the present invention, when request of access allowance to a network is received and transfer speed demanded by the request of access allowance cannot be met, service quality of a connection being serviced is degraded.

Another method for changing service quality adaptively in accordance with the present invention monitors whether available bandwidth is generated and upgrades service quality of a connection being serviced when available bandwidth is generated.

In one embodiment in accordance with the present invention, a connection, service quality of which is to be changed, is determined based on traffic policy.

In one embodiment in accordance with the present invention, the traffic policy is priority information assigned to a subject that generated the corresponding connection or requester of access allowance.

In another embodiment in accordance with the present invention, the traffic policy is priority information assigned to contents to be transferred, which is the object of the corresponding connection or request of access allowance.

In one embodiment in accordance with the present invention, a user is inquired about a connection, service quality of which has been determined to be changed, and according to the response, changing service quality of the corresponding connection is carried out.

In another embodiment in accordance with the present invention, service quality of a connection, service quality of which has been determined to be changed, is changed and the user of the corresponding connection is notified of the cause of the change.

In one embodiment in accordance with the present invention, change of service quality is carried out between HD (High Definition) and SD (Standard Definition).

In one embodiment in accordance with the present invention, a connection supposed to change its service quality is determined by a management device managing access allowance to a network.

In another embodiment in accordance with the present invention, a connection supposed to change its service quality is determined by a control application for controlling a plurality of devices connected to a network.

BEST MODE FOR CARRYING OUT THE INVENTION

Hereinafter, according to the present invention, preferred embodiments will be described in detail with reference to appended drawings.

In one embodiment of the present invention, when access allowance to a network for transferring contents data is requested, information describing traffic through which the transfer is carried out (which is called alternatively as traffic descriptor and in the following, is called as 'TD information' for short) is delivered to a manager for processing/managing a request of access allowance (hereinafter, the manager is referred to as 'QoS (Quality of Service) manager'.). TD information includes information about type of a corresponding traffic, e.g., information specifying real time data (streaming data) or non-real time data, information indicating whether change of service quality is possible along with information specifying requisites according to transfer quality (e.g., HD or SD) of a corresponding traffic (which is also called as 'Tspec information'). Individual Tspec information includes information about service rate required for streaming of traffic in a corresponding transfer quality.

Since the terminology of TD, Tspec, and so on as above is not necessarily required for the present invention, different terminology can be defined and utilized.

Hereinafter, described are embodiments where service quality is changed adaptively in accordance with the present invention.

Figure 1:
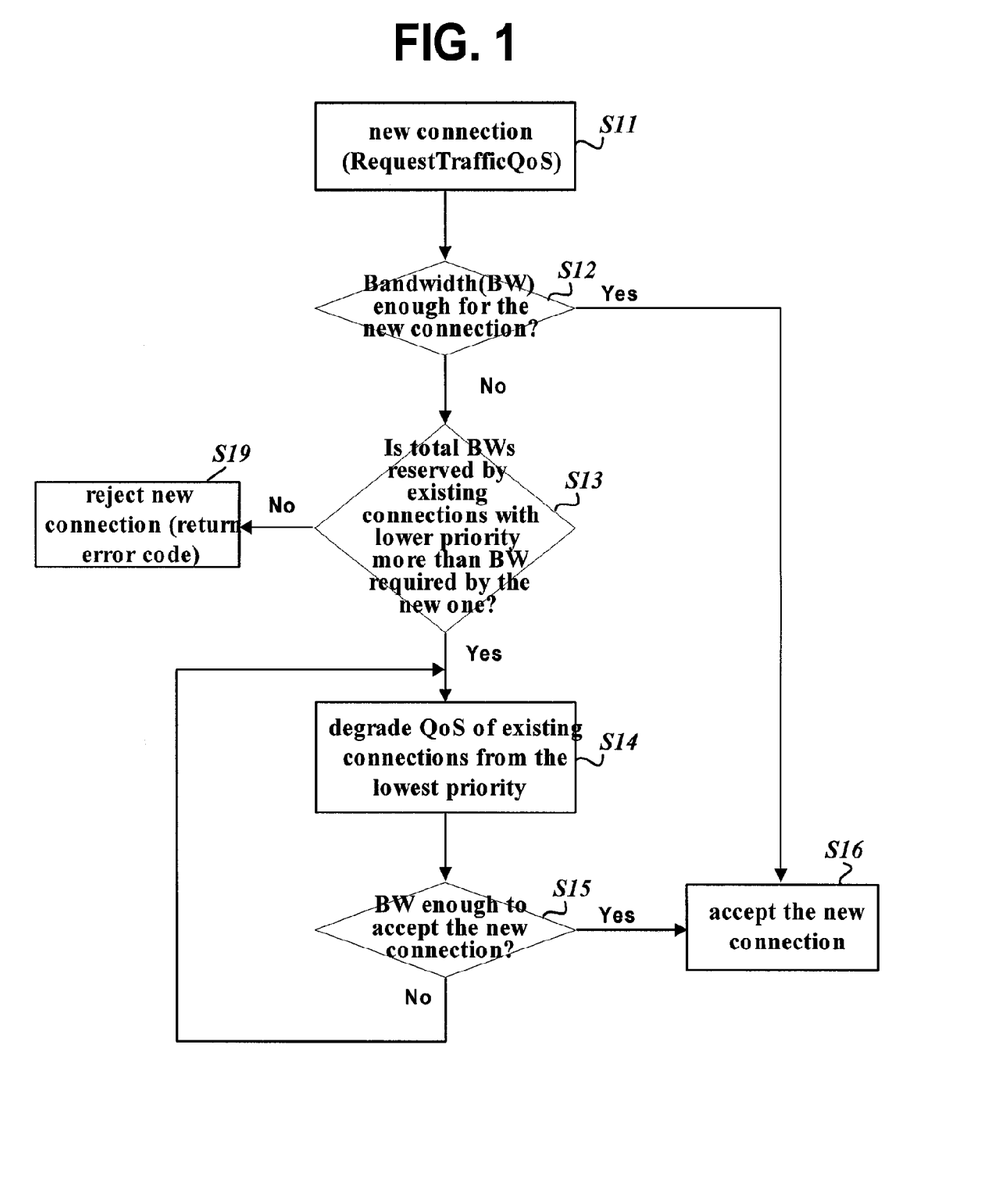
FIG. 1 illustrates a flowchart degrading service quality of contents being serviced in accordance with one embodiment of the present invention.

First of all, an embodiment is described, where service quality of contents being serviced is degraded. FIG. 1 illustrates a flowchart thereof. As shown, if there is a request for a new connection (request of access allowance to a network) S11, transfer speed (transfer speed specified in Tspec information designated as active in TD information) is checked from TD information accompanying the request; subsequently, it is determined whether the requested bandwidth can be accommodated by currently available bandwidth (which equals to remaining bandwidth after subtracting bandwidth reserved for streaming from total transfer bandwidth provided by a network) S12.

If currently available bandwidth is found to be enough, connection request is accepted S16. Otherwise, from among connections being serviced, sum of transfer speeds of connections having a priority lower than that of the newly requested connection is compared with transfer speed requested by the new connection S13. If the former is larger than the latter, service quality of connection(s) being serviced is changed S14. Otherwise, the newly requested connection is rejected S19.

In a method for changing service quality of a connection(s) being serviced, it is checked whether it is possible to degrade the service quality of a connection starting from the one having the lowest priority from among connections being serviced and having priority lower than that of the newly requested connection. For example, degrading service quality of a connection is determined to be possible when current service quality is HD (High Definition) and it is specified that change of service quality is possible. If it is found not to be possible, checking process of whether it is possible to degrade service quality is carried out in the same way on the next highest connection; for those connections which are found to be possible, a process is carried out to degrade service quality, e.g., to SD (specific operations among devices to degrade service quality are described later.). In another embodiment of the present invention, when change of service quality is not possible for a connection (e.g., the case when an alternative Tspec dose not exist), the connection is released and operations described above can be carried out on a connection having the next highest priority. It is checked whether currently available bandwidth including bandwidth newly generated as above can accommodate the newly requested connection S15. When found not to be enough for the newly requested connection, the same process is carried out on a connection of the next highest priority. During the process, if the newly requested connection can be accommodated, the requested connection is accepted S16.

Even though service quality of a connection(s) having priority lower than that of the new connection has been degraded, when the newly requested connection cannot be accommodated because a connection whose service quality can be degraded is not found, connections are released sequentially beginning from the one having the lowest priority until the newly requested connection can be accommodated.

In another embodiment of the present invention, as described above, when change of service quality is not possible, the corresponding connection is released, whereas service quality of the corresponding connection is degraded when change of service quality is possible. The aforementioned operations are carried out in the same way on a connection in the next highest priority until the newly requested connection can be accommodated.

Figure 2:
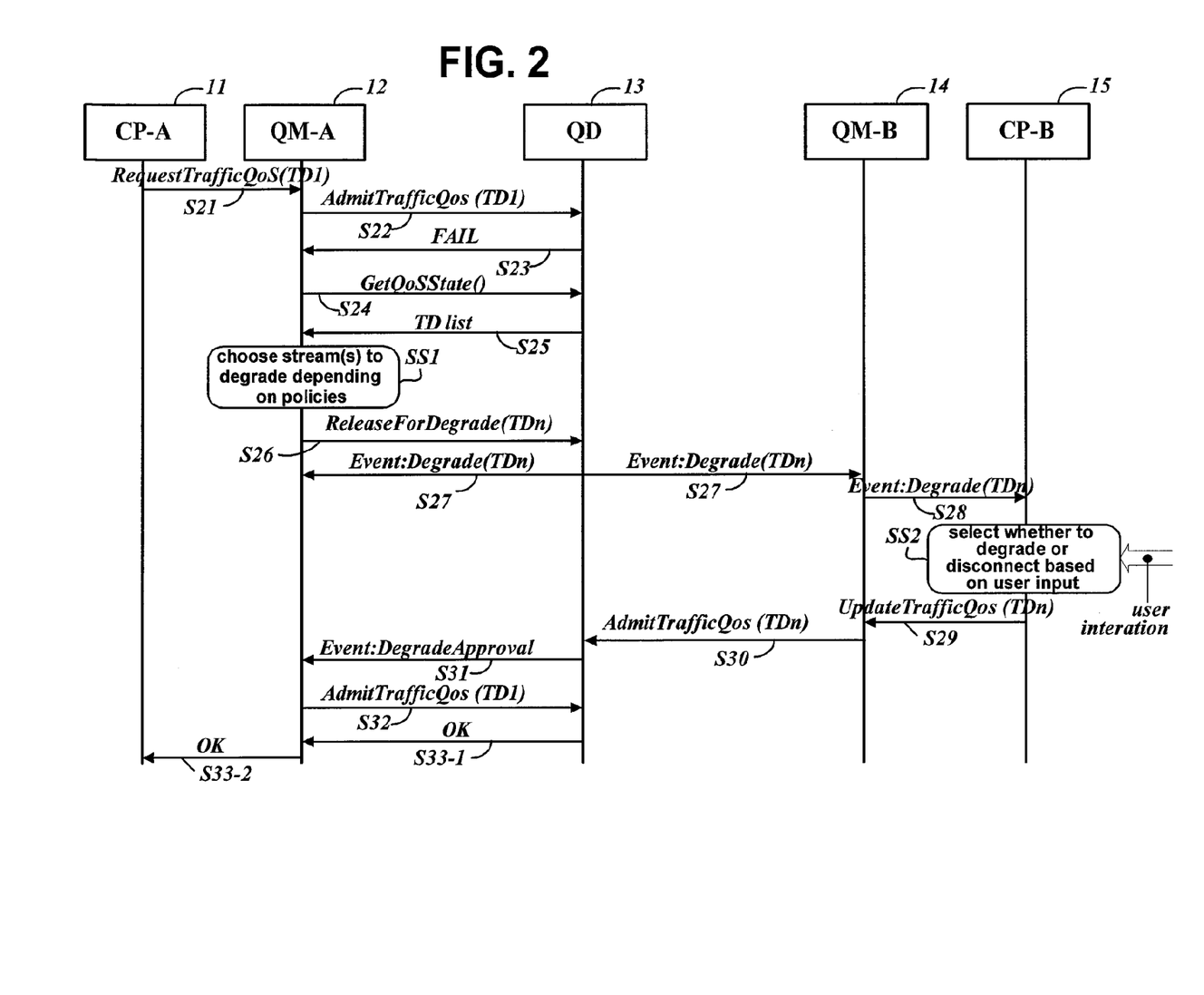
FIG. 2 illustrates a procedure of exchanging signals among devices, wherein service quality of contents being serviced is degraded in accordance with an embodiment of FIG. 1.

FIG. 2 illustrates a procedure of exchanging signals among devices, wherein service quality of contents being serviced is degraded in accordance with one embodiment of the present invention.

Since the procedure shown in FIG. 2 is only one of signal exchange methods among various devices for degrading service quality of contents and principles and spirit of the present invention are not limited by the procedure shown in FIG. 2, other inventions incorporating different signal exchange methods based on principles and spirit of the present invention should be considered to belong to the scope of the present invention.

First, when a user makes a connection request for contents streaming by using a control point 11, S21, the control point 11 configures TD information for the connection and makes a request on a corresponding QoS manager 12 for allowance of connection S22 (in the figure, two pairs of corresponding control point and QoS manager are denoted by A and B for the purpose of description of the present invention.). QoS device (QD) which receives the request 13, when transfer speed requested by the TD information cannot be serviced with currently available bandwidth, returns a response notifying that connection is not allowed S23. At this point, it should be noted that QoS device 13 comprises multiple devices including a source and destination device for an arbitrary connection and any device if the device exists in a data transfer route between the source and destination device; in the following, unless stated otherwise, 'QoS device' represents a device in the context described above.

When a request for allowance of connection is rejected, the QoS manager 12 makes a request on the QoS device 13 for information about connections being serviced S24, thereby obtaining TD information about all the connections being serviced from the QoS device 13; subsequently, QoS manager 12 obtains TD policy from corresponding TD information and compares the TD policy with that of a connection rejected for access. In an embodiment in accordance with the present invention, the TD policy is priority of a user who requested a corresponding connection. In another embodiment of the present invention, the TD policy is priority assigned to contents to be transferred after a connection is established. For example, HD contents can have a higher priority than SD contents. Surely, different information not mentioned in the description of the present invention can be used as the TD policy. In a comparison of the TD policies, a connection n is chosen for degrading service quality, TD policy of which is lowest from among connections having TD policies lower than that of the above connection rejected for access; and being serviced in a high service quality (e.g., serviced in HD) and with service quality specified as changeable (connections with TD information containing a plurality of Tspec information) SS1. Alternatively, a connection n can be chosen for degrading service quality from among connections having TD policies lower than that of the above connection rejected for access, TD information of the connection having a plurality of Tspec information and the connection being serviced based on Tspec information of high quality from the plurality of Tspec information. Although a single connection is assumed to be chosen in the description on the present embodiment, service quality of more than one connection may need to be degraded in order to allow the aforementioned connection request. For this case, since operations for connection n described below can be equally applied to other connections whose service qualities are determined to be degraded, description is omitted for such a case of degrading service qualities of a plurality of connections.

The QoS manager 12 requests an action for requesting of degrading service quality of the chosen connection n on the QoS device 13 along with TD information TDn of the connection (In this TD information, ActiveTspecIndex parameter specifies Tspec information of low quality.) S26. Upon reception of the request S26, the QoS device 13 generates an event for degrading service quality (Event:Degrade) S27; TD information TDn of a connection chosen for degrading service quality is also carried in the event. The event is delivered to QoS manager 12, 14 which previously subscribed to the corresponding event (In embodiments of the present invention, all the QoS mangers are assumed to have subscribed to corresponding events).

All the QoS managers 12, 14 that received the event, transfers the event to all the control points which subscribed thereto; a control point determines whether a target connection from which the event has been generated is the connection requested for access and thus being serviced by the control point itself. If the target connection is not the connection that the control point has requested for access, the event is ignored. Since in an embodiment of FIG. 2, a control point 15 of group B is assumed to be a subject requesting for the connection n, a control point 11 of group A ignores the event. As an event for degrading service quality is relayed from QoS manager 14 of group B S28, the control point 15 determines how to process the corresponding connection based on interactions with the user SS2. For example, whether to degrade service quality of a connection requested for degrading service quality or to request disconnection of streaming service is notified through an appropriate UI (User Interface) and selection from the two choices is received. If the user's selection is degrading service quality, the control point 15 requests an action (UpdateTrafficQoS) on the corresponding QoS manager 14, the action instructing update of traffic QoS according to Tspec information specified as active in TD information TDn of a connection received by the event (Event:Degrade) S29. If the user's selection is disconnection of service, the control point 15, instead of an action (UpdateTrafficQoS) for the update of traffic QoS, requests an action on the QoS manager 15, the action instructing release of the corresponding connection n.

In another embodiment in accordance with the present invention, degrading service quality can be carried out without user interaction. For example, when degrading service quality is set to 'automatic' in TD information of a connection for which degrading service quality has been requested, the control point 15 can immediately carry out the request operation S29 without user interaction.

In a further embodiment in accordance with the present invention, when degrading service quality is carried out without user interaction or a corresponding connection is released, explanation about a cause for degrading service quality or releasing the corresponding connection can be provided to the user of the corresponding connection (namely, a control point that generated the connection).

The QoS manager 14, which receives an action for traffic QoS reconfiguration, transforms the request into a message compliant with a format for transferring information to and from the QoS device 13 and makes a request on the QoS device 13 for access allowance S30. The QoS device 13, then, services the corresponding connection n with a transfer speed according to low service quality and generates an event (Event:DegradeApproval) notifying completion of degrading service qualities of other connections according to a transfer speed requested by TD information (TD1) of a connection which requested access allowance previously S31. In another embodiment of the present invention, instead of an event notifying completion of degrading service quality, completion of degrading service quality can be notified in response to a previous action for degrading service quality (ReleaseForDegrade). As for the event (Event:DegradeApproval), by the QoS manager's 12 subscribing at an appropriate time, e.g., at the time of requesting an action for degrading service quality S26, only the QoS manager that requested degrading service quality (in the example of FIG. 2, QoS manager 12 of group A) can receive the event.

The QoS manager 12, which receives the event for completion of degrading service quality, makes a request of access allowance on the QoS device 13 again with TD information TD1 of a connection, a request of access allowance of which was rejected in a previous stage S32; the QoS device 13 provides a response permitting the access when a transfer speed requested by Tspec of TD information TD1 accompanying the received access request can be provided S33-1, the response being relayed to the corresponding control point 11 as a response to the previous action S21 "RequestTrafficQos" S33-2.

If, after requesting the action for degrading service quality, either an event for completion of degrading service quality is not received within a prescribed time or a response notifying of completion of degrading service quality is not received, the QoS manager 12 gives the control point 11 a response notifying that the action for request of access allowance (RequestTrafficQoS) has been rejected.

As described above, by securing additional bandwidth due to degrading service quality for other connections, service to another connection through the QoS device 13 can be realized.

Figure 3:
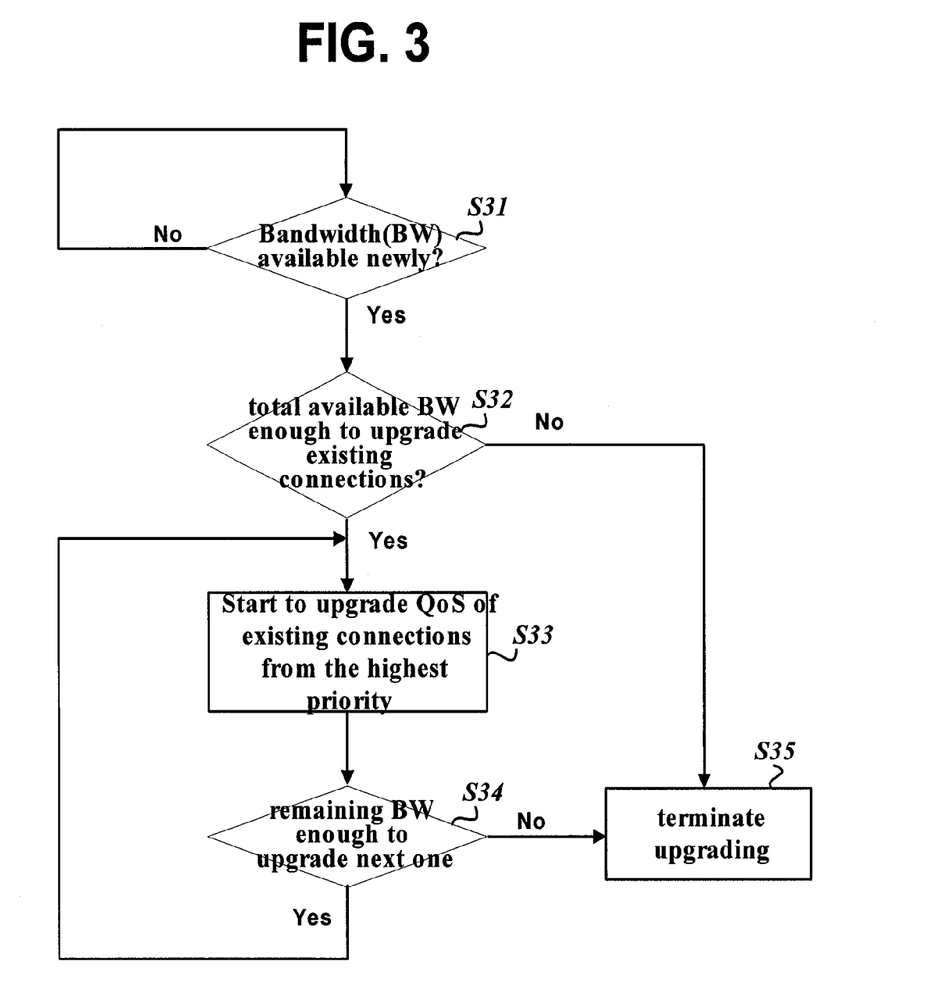
FIG. 3 illustrates a flowchart upgrading service quality of contents being serviced in accordance with one embodiment of the present invention.

FIG. 3 illustrates a flowchart of an embodiment for upgrading service quality of contents being serviced. As shown in FIG. 3, when additional bandwidth becomes available S31, it is determined whether qualities of connections being services can be upgraded by utilizing the total available bandwidth including a newly available bandwidth S32.

If upgrading service quality even for a single connection is not achievable, process for upgrading service quality is terminated S35. Otherwise, by starting from a connection of highest priority, the service quality is changed S33. If TD information of a connection having a priority for upgrading service quality is specified as changeable service quality and streaming of the connection is provided in a low quality, e.g., SD, service quality of the connection is upgraded to HD (specific operations between devices for upgrading service quality are described later.). If the above condition is not met, the same process is carried out on a connection of the next highest priority. When available bandwidth is reduced due to upgrading service quality of a connection, it is determined whether service quality of a connection of the next highest priority can be upgraded with the reduced bandwidth S34. When the available bandwidth is not sufficient for upgrading service quality of another connection, the process of upgrading service quality is terminated S35.

Figure 4A:
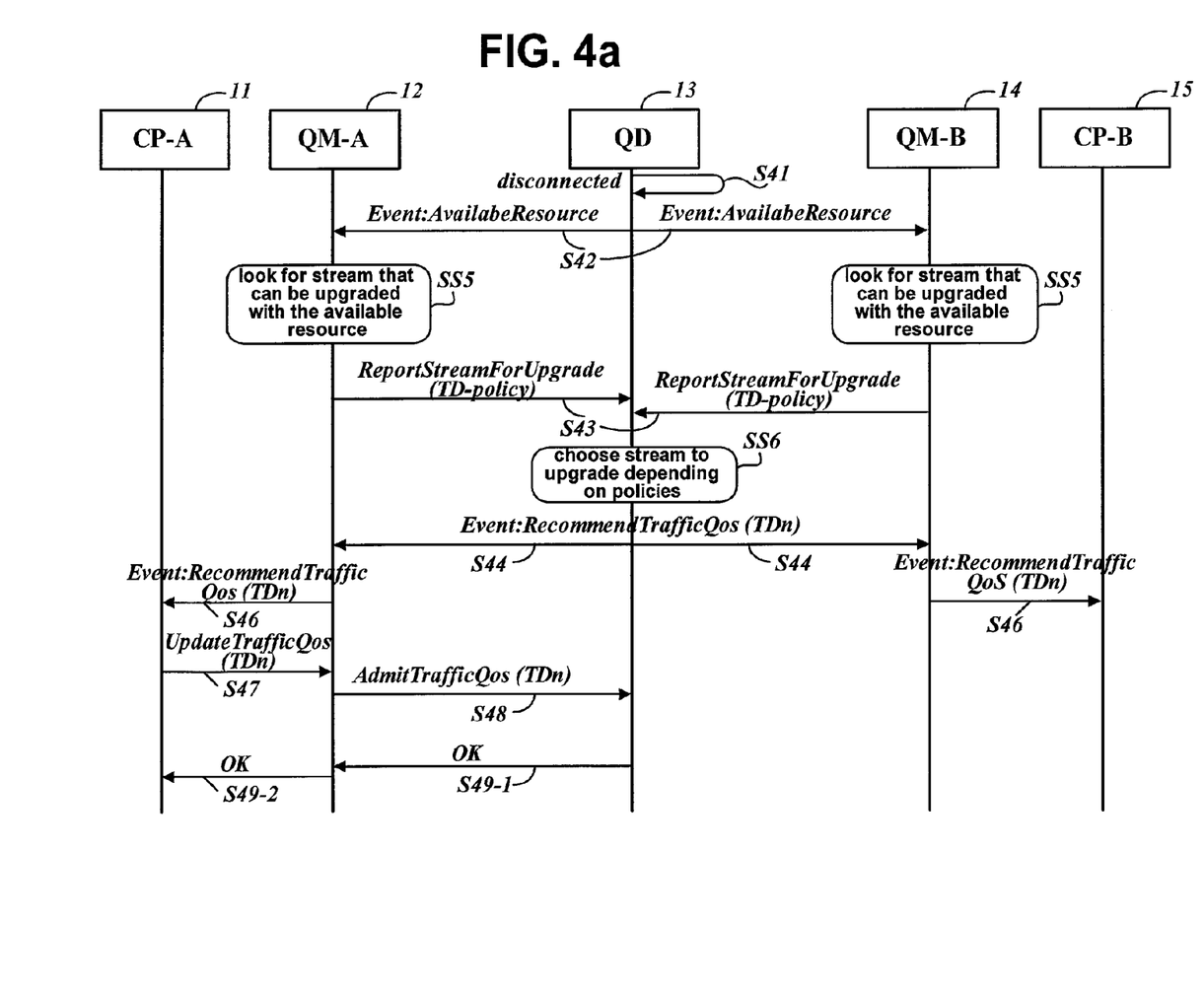
FIGS. 4a and 4b respectively illustrate procedures of exchanging signals among devices, wherein service quality of contents being serviced is upgraded in accordance with an embodiment of FIG. 3.

FIG. 4a illustrates a procedure of upgrading service quality of contents being serviced in accordance with one embodiment of the present invention.

Since the procedure shown in FIG. 4a is only one of signal exchange methods among various devices for upgrading service quality of contents and principles and spirit of the present invention are not limited by the procedure shown in FIG. 4a (and FIG. 4b which is described later), other inventions incorporating different signal exchange methods based on principles and spirit of the present invention should be considered to belong to the scope of the present invention.

First, when a connection being serviced is released S41, QoS device 13 generates an event notifying of generation of available bandwidth due to the release S42. The generated event is delivered to devices which have already subscribed to the event; for the purpose of description of an embodiment of the present invention, QoS managers 12, 14 are assumed to have subscribed to the event. Therefore, the event for generation of available bandwidth originated from the QoS device 12 is delivered to respective QoS managers (12, 14) S42. In another embodiment of the present invention, respective QoS managers 12, 14 can periodically inquire of the QoS device 13 about currently available bandwidth and receive the inquiry result, thereby becoming to know whether additional bandwidth has been generated to a network resource.

Each of the QoS managers 12, 14, based on TD policy and TD information of connections with service qualities managed by the QoS manager itself, determines one or more than one connection for upgrading service quality. Each of the QoS managers 12, 14, based on TD information of connections with service qualities managed by the QoS manager itself, determines one or more than one connection for upgrading service quality from among connections which have service qualities designated as changeable and are serviced in a low service quality and furthermore, upgrading service qualities can be accommodated within the total bandwidth currently available SS5; the QoS manger 13 receives the determined connections or TD policies or policy list of connections, S43.

In another embodiment of the present invention, each of the QoS managers 12, 14 may not sustain management of a corresponding connection after approval of a requested access allowance. In the present embodiment, when each of the QoS managers 12, 14 receives an event for generation of available bandwidth, receives information about all the connections being serviced by requesting an action and determines a connection or connections for upgrading service quality as in the embodiment described above.

When the QoS device 13 receives TD policies of connections determined for upgrading service qualities by each of QoS managers 12, 14 based on TD policies of respective connections, the QoS device 13 determines one or more than one connection, upgrading service quality of which is possible within the total bandwidth currently available considering transfer speeds of streams being actually serviced SS6. FIG. 4a illustrates an example where a connection n on which a control point 11 of group A has requested access is determined for upgrading service quality. Therefore, if the QoS device 13, with regard to an action "ReportStreamForUpgrade" from each of the QoS managers 12, 14, generates an event carrying TD information (TDn) (This TD information includes information designating Tspec information about upgraded service quality as active.) of a connection n which has been determined for upgrading service quality S44, the event is ignored by control points 15 of group B when the event is relayed to corresponding control points 11, 15 by each of the QoS managers 12, 14 (S46). Although a single connection is assumed to be chosen for upgrading service quality in the description of the present invention, it can be equally applied to a plurality of connections. In the case of a plurality of connections, since operations described below are carried out for each connection, detailed description thereof is omitted.

The event relayed by QoS manager 12 of the group A is delivered to a control point 11 of the same group which has previously subscribed to the corresponding event. Subsequently, the control point 11 requests the QoS manager 12 for an action (UpdateTrafficQoS) instructing update of Traffic QoS according to Tspec information about high service quality, e.g., HD, which has been designated as active by TD information (TDn) of a connection received by the event S47; the QoS manager 12 transforms the request into a message compliant with a format for transferring information to and from the QoS device 12 and makes a request on the QoS device 12 for access allowance S48. Finally, if the QoS device 13 can provide a transfer speed demanded by Tspec of TD information accompanying a received request of access allowance, the QoS device 13 provides a response permitting the access S49-1, the response being relayed to the control point 11 as a response to the action "UpdateTrafficQoS" S49-2.

As described above, by reconfiguring streaming of contents to a transfer speed suitable for enhanced service quality, streaming of contents in an enhanced quality is implemented by the QoS device 13.

Figure 4B:
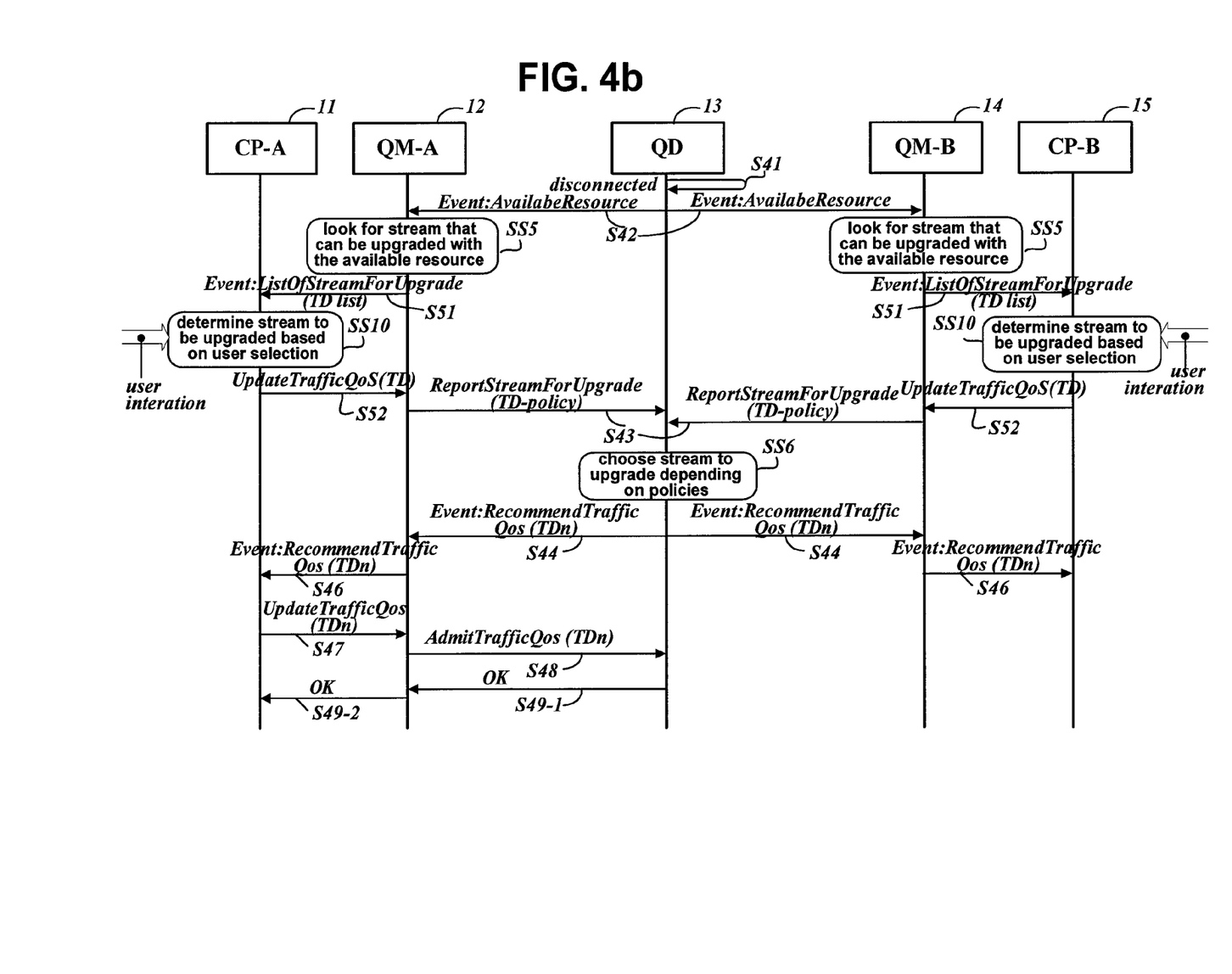

In another embodiment in accordance with the present invention, a user's choice can be incorporated in the determination of a connection for upgrading service quality. FIG. 4b illustrates a procedure for exchanging signals among devices by an embodiment according thereto.

As shown in FIG. 4b, if each QoS manager 12, 14 receives an event for generation of available bandwidth S42, a new event is generated with regard to the event and delivered to each of control points 11, 15. At this time, each QoS manager 12, 14 searches connections, qualities of which are managed by each QoS manager, for connections whose service qualities can be upgraded within the total bandwidth currently available SS5 and includes a list of TD information about connections found from the search in the event, thereby delivering the event to the control point S51. In another embodiment of the present invention, transfer information about all the connections is requested on the QoS device 13; after the transfer information being received, the transfer information is delivered to a control point along with the event. In a further embodiment in accordance with the present invention, when each control point 12, 14 receives an event S51, TD information about connections is requested on the QoS manager 12, 14 and information managed by the QoS manager or information received by a request on QoS device 13 is provided to each control point 11, 15 by each QoS manager 12, 14.

Each control point 11, 15, by providing connections having TD information indicating upgrade of service quality for a user through an appropriate user interface method, enables the user to choose one or more than one connection from the provided connection information SS10. When one or more than one connection is chosen, each control point 11, 15 makes a request on each QoS manager 12, 14 for an action to upgrade service quality of a chosen connection S52, each QoS manager 12, 14 checks TD policy about a requested connection and transfers checked TD policy or a list of TD policies to the QoS device 13, S43. A procedure, wherein one or more than one connection is chosen and service quality thereof is upgraded afterwards, is the same as an embodiment described with reference to FIG. 4*a*.

At least one embodiment of the present invention described above with a limited number of embodiments, by changing contents service of a data service, e.g., a streaming service through an appropriate method, allows other data services and also upgrades contents quality when available bandwidth is generated, thereby enabling a given network resource fully utilized.

The foregoing description of a preferred embodiment of the present invention has been presented for purposes of illustration. Thus, those skilled in the art may utilize the invention and various embodiments with improvements, modifications, substitutions, or additions within the spirit and scope of the invention as defined by the following appended claims.

The invention claimed is:

1. A method of upgrading quality of a connection for data transmission, the method performed by an electronic device and comprising:
    displaying at least one upgradable connection of the electronic device when an available bandwidth for the data transmission is increased;
    receiving, a user input via a user interface to select one or more of the displayed at least one upgradable connection; and
    upgrading a transmission quality of the selected one or more of the displayed at least one upgradable connection according to the increased available bandwidth,
    wherein the at least one upgradable connection is determined based on traffic descriptor information and policy information corresponding the traffic descriptor information,
    wherein the traffic descriptor information includes at least an available data rate list, an activated data rate, and information indicating whether transmission quality is changeable,
    wherein the activated data rate indicates a specific data rate from the available data rate list that is used for the at least one upgradable connection, and
    wherein the policy information indicates priority information of the at least one upgradable connection.

2. The method of claim 1, wherein the displayed at least one upgradable connection is a connection supporting higher transmission quality than a current transmission quality.

3. The method of claim 1, wherein the displayed at least one upgradable connection is determined by the electronic device or by another electronic device.

4. An electronic device for upgrading quality of a connection for data transmission, the apparatus comprising:
    a display unit configured to display information and provide a user interface; and
    a processor configured to:
        control the display unit to display at least one upgradable connection of the electronic device when an available bandwidth for the data transmission is increased;
        control the display unit to display the user interface and receive a user input via the user interface to select one or more of the displayed at least one upgradable connection;
        upgrade a transmission quality of the selected one or more of the displayed at least one upgradable connection according to the increased available bandwidth; and
        transmit data according to the upgraded transmission quality,
    wherein the at least one upgradable connection is determined based on traffic descriptor information and policy information corresponding the traffic descriptor information,
    wherein the traffic descriptor information includes at least an available data rate list, an activated data rate, and information indicating whether transmission quality is changeable,
    wherein the activated data rate indicates a specific data rate from the available data rate list that is used for the at least one upgradable connection, and
    wherein the policy information indicates priority information of the at least one upgradable connection.

5. The electronic device of claim 4, wherein the displayed at least one upgradable connection is a connection supporting higher transmission quality than a current transmission quality.

6. The electronic device of claim 4, wherein the displayed at least one upgradable connection is determined by the electronic device or by another electronic device.

* * * * *